(12) United States Patent
Nagata et al.

(10) Patent No.: US 7,573,056 B2
(45) Date of Patent: Aug. 11, 2009

(54) SCINTILLATOR PANEL

(75) Inventors: Yasushi Nagata, Kodaira (JP); Takehiko Shoji, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 12/019,429

(22) Filed: Jan. 24, 2008

(65) Prior Publication Data

US 2008/0179533 A1 Jul. 31, 2008

(30) Foreign Application Priority Data

Jan. 29, 2007 (JP) ............................. 2007-017626

(51) Int. Cl.
*G01T 1/20* (2006.01)

(52) U.S. Cl. .................. 250/580; 250/370.11

(58) Field of Classification Search ............ 250/370.11, 250/580, 581
See application file for complete search history.

(56) References Cited

U.S. PATENT DOCUMENTS

| 7,265,371 B2 * | 9/2007 | Shoji et al. ............ 250/581 |
| 2003/0160185 A1 * | 8/2003 | Homme ............ 250/483.1 |
| 2005/0274916 A1 * | 12/2005 | Shoji et al. ............ 250/580 |

FOREIGN PATENT DOCUMENTS

| JP | 54-35060 | 10/1979 |
| JP | 2001-59899 | 3/2001 |

* cited by examiner

*Primary Examiner*—David P Porta
*Assistant Examiner*—Mark R Gaworecki
(74) *Attorney, Agent, or Firm*—Finnegan, Henderson, Farabow, Garrett & Dunner, L.L.P.

(57) ABSTRACT

A scintillator panel comprising: a scintillator sheet comprising a substrate having thereon a phosphor layer produced with a vacuum evaporation method; and a protective film covering the scintillator panel, wherein the protective film comprises a light absorbing layer which is colored so as to absorb a light emitted from the phosphor layer.

5 Claims, 1 Drawing Sheet

SCINTILLATOR PANEL

This application is based on Japanese Patent Application No. 2007-017626, filed on Jan. 23, 2007 in Japanese Patent Office, the entire content of which is hereby incorporated by reference.

FIELD OF THE INVENTION

The present invention relates to a scintillator panel.

BACKGROUND OF THE INVENTION

Radiographic images such as X-ray images have been widely utilized for diagnoses of a patient at medical scenes. A radiation imaging system using a radiation detector has come into widespread use in recent years. In this system, image data due to two-dimensional radiation is obtained as an electric signal by using a radiation detector, which is then processed and displayed on a monitor.

The scintillator panel serves to convert the radiation coming from the substrate side into light. The FPD (Flat Panel Detector) developed as an image radiographing apparatus in the 1990s is a radiation detector made up of a combination of a scintillator panel and image pickup element. In this case, cesium iodide (CsI) is often used as the material of the scintillator. The CsI has a relatively high conversion rate from X-ray to visible light and easily forms a columnar crystal structure by vacuum evaporation, and therefore, the scatter of the emitted light can be minimized by the light guiding effect.

However, the light emitting efficiency of the CsI alone is low. Accordingly, for example, a mixture of CsI and sodium iodide (NaI) blended at a desired mole ratio is deposited on a substrate via vacuum evaporation as sodium activated cesium iodide (CsI:Na), and annealing is provided in a post process, whereby the efficiency of conversion to visible light is enhanced. This is used as an X-ray phosphor (e.g., refer to Patent Document 1). Further, in recent years, a proposal has been made of an X-ray phosphor manufacturing method wherein an activator such as indium (In), thallium (Tl), lithium (Li), potassium (K), rubidium (Rb) and sodium (Ma) is formed by sputtering (e.g., refer to Patent Document 2).

However, the CsI-based scintillator is deliquescent and has a problem of deterioration with time. To avoid such degradation with time, a proposal has been made of a moisture proof protective layer formed on the surface of the CsI scintillator.

According to the conventional method, the sharpness of the image (hereafter also referred to as merely "sharpness") obtained by the scintillator panel has been considered to increase as the thickness of the protective film becomes smaller. On the other hand, the thinner the thickness of the protective layer is, the lower the durability tends to be. To solve this problem, efforts have been made to select a protective film material that has functions to ensure durability while suppressing the deterioration in sharpness by minimizing the thickness of the protective layer. For example, attempts have been made to utilize a material having excellent strength and transparency such as polyethylene terephthalate, several types of resins in combination, or a protective layer having a multilayer structure.

However, in order to obtain long time conveyance durability, it has been necessary to increase the thickness of the protective film, whereby the sharpness has been lowered.

Patent Document 1 Examined Japanese Patent Publication No. 54-35060

Patent Document 2 Japanese Patent Application Publication Open to Public Inspection (hereafter referred to as JP-A) No. 2001-59899

SUMMARY OF THE INVENTION

An object of the present invention is to provide a scintillator panel capable of forming a radiation image exhibiting excellent sharpness of the image, while maintaining a high degree of sensitivity.

One of the aspects of the present invention to achieve the above object is a scintillator panel comprising; a scintillator sheet comprising a substrate having thereon a phosphor layer produced with a vacuum evaporation method; and a protective film covering the scintillator panel, wherein the protective film comprises a light absorbing layer which is colored so as to absorb a light emitted from the phosphor layer.

DESCRIPTION OF THE PREFERRED EMBODIMENTS

Figure 1:
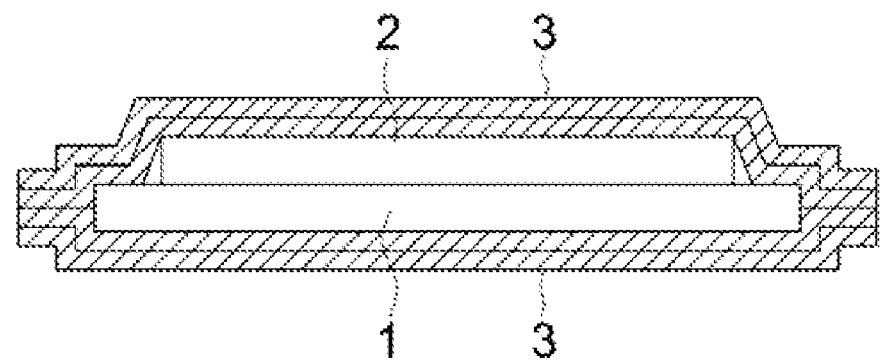
FIG. 1 is a cross sectional view showing an example of the scintillator panel of the present invention.

The aforementioned object of the present invention is achieved by the following structures:

1. A scintillator panel comprising:
   a scintillator sheet comprising a substrate having thereon a phosphor layer produced with a vacuum evaporation method; and
   a protective film covering the scintillator panel, wherein the protective film comprises a light absorbing layer which is colored so as to absorb a light emitted from the phosphor layer.
2. The scintillator paenl of Item 1, wherein a transmittance of the protective film at an emission wavelength of the light emitted from the phosphor layer is 50 to 97%.
3. The scintillator panel of Item 1 or 2, wherein a thickness of the protective film is 10 to 100 μm.
4. The scintillator panel of any one of Items 1 to 3, wherein a mositure permability of the protective film is 50 g/m²·day or less.
5. The scintillator panel of any one of Items 1 to 4, wherein the phosphor layer comprises CsI.

1. A scintillator panel including a scintillator sheet having at least a phosphor layer formed on a substrate by vacuum evaporation; and a protective film for covering this scintillator sheet, wherein this protective film has a light absorbing layer which is so colored that the protective film absorbs the light emitted from the phosphor layer.

2. The scintillator panel described in Structure 1 wherein the light transmittance in the emission wavelength of the aforementioned protective film lies within the range from 50 through 97%.

3. The scintillator panel described in Structure 1 or 2 wherein the thickness of the aforementioned protective film is within the range from 10 through 100 μm.

4. The scintillator panel described in any one of the Structures 1 through 3 wherein the moisture permeability of the aforementioned protective film does not exceed 50 g/m²·day.

5. The scintillator panel described in any one of the Structures 1 through 4 wherein the aforementioned phosphor layer is CsI (cesium iodide).

The present invention provides a scintillator panel capable of forming a radiation image of enhanced sharpness of the image while maintaining a high degree of sensitivity.

The following describes the details of the present invention:

The present invention provides a scintillator panel containing a scintillator sheet having at least a phosphor layer formed on a substrate via vacuum evaporation; and a protective film for covering the scintillator sheet, wherein the protective film has a light absorbing layer which is so colored that the protective film absorbs the light emitted from the phosphor layer.

The films used as the protective film, for example, polypropylene firm, polyethylene terephthalate film and polyethylene naphthalate film, have a large refractive index while exhibiting excellent physical properties. Accordingly, a part of emitted light entering the protective film is repeatedly reflected on the boundaries on the upper and lower portions of the film, and is propagated far away from the scanned site, with the result that the sharpness is reduced. The light absorbing layer of the present invention is considered to have the effect of minimizing this reflected light.

From the viewpoint of luminance and sharpness, the light absorbing layer preferably has a transmittance at an emission wavelength of the light emitted from the phosphor layer is 50 to 97%.

The scintillator panel of the present invention contains: a scintillator sheet having at least a phosphor layer formed on the substrate via vacuum evaporation; and a protective film for covering the scintillator sheet.

The following describes the components of the scintillator panel of the present invention:

(Phosphor Layer)

The phosphor of the phosphor layer of the present invention refers to the phosphor that absorbs the energy of the emitted radiation such as X-ray and emits an electromagnetic wave having a wavelength of 300 nm to 800 nm, namely, an electromagnetic wave (light) ranging from ultraviolet to infrared around the visible light.

Various forms of conventionally known phosphor materials can be used to form the phosphor. Of these materials, cesium iodide (CsI) is preferably utilized because it has a relatively large conversion rate from X-ray to visible light, and provides easy formation of a phosphor having a columnar crystal structure by vacuum evaporation, with the result that the scattering of the emitted light inside the crystal can be minimized due to the light guiding effect and the thickness of the phosphor layer can be increased. Use of CsI alone provides a low light emitting efficiency, and therefore, addition of various forms of activators is further preferred.

For example, a mixture of CsI and sodium iodide (NaI) blended at a desired mole ratio can be cited as a phosphor, which has been disclosed in Examined Japanese Patent Publication No. 54-35060. Also, for example, as disclosed in the JP-A No. 2001-59899, it is preferred to use CsI containing such as indium (In), thallium (Ti), lithium (Li), potassium (K), rubidium (Rb) or sodium (Na) as an activator, and formed via vacuum evaporation.

It is also preferred that an activator containing one or more thallium compounds and cesium iodide should be used as a raw material. Namely, the thallium-activated cesium iodide (CsI:Tl) is preferable because, it exhibits a wide-range of emission wavelength from 400 nm through 750 nm. Various forms of thallium compounds (compound having a oxidation number of +I and +III) can be used as the thallium compound as the activator containing one or more thallium compounds of the present invention. The thallium compound preferably used in the present invention is exemplified by thallium bromide (TlBr), thallium chloride (TlCl) or thallium fluoride (TlF, $TlF_3$).

In the phosphor of the present invention, the amount of the activator contained therein is preferably optimized in conformity to the intended performances. The amount of the activator is preferably in the range of 0.001 through 50 mol %, more preferably 0.1 through 10.0 mol %, based on the content of cesium iodide. If the amount of activator is less than 0.001 mol % based on the amount of cesium iodide, there is no big difference from the emission luminance obtained by cesium iodide alone. Further, if it is more than 50 mol %, the properties and functions of cesium iodide cannot be maintained.

(Substrate)

A polymer film is used as a substrate. A polyimide (PI) or a polyethylene naphthalate (PEN) film is preferably used from the viewpoint of heat resistance.

Further, when the scintillator panel is laminated with the surface of a fiat light-receiving element to form a flat panel detector for radiation, it was found that an uniform sharpness can be obtained over the entire light receiving surface of the flat panel detector can be obtained by employing a polymer film having a thickness of 50 through 500 μm as a substrate. The polymer film having such a thickness can foe deformed to fit the configuration of the surface of the flat light-receiving element when laminated, and thus an uneven image quality over the light receiving surface of the flat panel detector due to the deformation of the substrate or the curl at vacuum evaporation can be avoided.

(Protective Film)

The protective film provides the phosphor layer with moisture resistance, and reduces the deterioration of the phosphor layer. It is formed of a film characterized by lower moisture permeability. For example, a polyethylene terephthalate film (PET) can be utilized. In addition, a polyester film, polymethacrylate film, nitro cellulose film, cellulose acetate film, polypropylene film and polyethylene naphthalate film can also be employed. Also used is a laminate film formed by vacuum evaporating a metal oxide layer on one or more of these films in conformity to the required moisture resistance.

(Light Absorbing Layer)

In the present invention, the protective layer preferably has a light absorbing layer which is colored so as to absorb a light emitted from the phosphor layer. Examples of a resin preferably used to form the light absorbing layer include: fluoroolefin-vinyl ether copolymer, polypropylene, polyethylene terephthalate and polyethylene naphthalate. Examples of a colorant preferably used to color the light absorbing layer include; Zabon First Blue 3G by Hoechst Co., Ltd., ultramarine blue colorant, cobalt blue colorant, chromium oxide and $TiO_2$—ZnO—CoO—NiO pigment. Further, particles such as silica are preferably incorporated in the light absorbing layer to control the surface roughness and the transparency of the light absorbing layer.

Further, the surfaces of the upper and lower protective films each facing the substrate side and the phosphor layer side of the scintillator sheet are preferably provided with a heat sealable resin that seals the protective films by heat. The heat sealed layer can be formed by the resin film that can be sealed by a commonly employed impulse sealer. For example, an ethylene-vinyl acetate copolymer (EVA) film, a polypropylene (PP) film, and a polyethylene (PE) film can be employed, however, the present invention is not limited thereto.

Sealing can be carried out by sandwiching the scintillator sheet between the upper and lower protective films, and by fusing and bonding the ends where the upper and lower protective films come in contact under a reduced pressure.

In the present invention, the protective film preferably has a thickness of 10 to 100 μm.

In the present invention, the protective film is provided with moisture resistance. More specifically, the moisture permeability (also called the moisture vapor transmittance) of the aforementioned protective layer is preferably 50 g/m$^2$·day or less, more preferably 10 g/m$^2$·day or less, and still more preferably 1 g/m$^2$·day or less. The moisture permeability of the protective layer can be measured according to the method stipulated in the JIS Z 0208.

More specifically, the moisture permeability in the present invention can be measured by the following procedure: One side is kept at 90% RH (relative humidity), and the ether side is kept dry using a moisture absorbing agent, at 40° C. with the aforementioned protective film used as a boundary surface. Thus, the mass (g) of vapor passing through this protective film in 24 hours under this condition (in terms of 1 m$^2$ of protective film) is defined as the moisture permeability of the protective film in the present invention.

To control the moisture permeability of the protective film within the aforementioned range and to enhance the moisture resistance, it is preferred to use a thin alumina film formed via vacuum evaporation on a polyethylene terephthalate film or a polyethylene naphthalate film.

To define the light transmittance of the protective film, the light transmittance of each protective film is expressed in terms of a relative value wherein the light transmittance in the case of air alone is set at 100%. The aforementioned light transmittance is obtained from the following equation:

Light transmittance (%)=(transmitted light/incoming light)×100

The scintillator sheet of the present invention can also be produced as follows: The following conductive metal reflection layer is arranged on the substrate and a protective layer is provided thereon, followed by providing a phosphor layer via vacuum evaporation.

(Conductive Metal Reflection Layer)

The conductive metal reflection layer can be used as a reflecting layer since the light obtained from conversion by the scintillator is outputted to the outside by this layer. To enhance the effective use of the emitted light, the conductive metal reflection layer is preferably formed of a metal characterized by a high degree of reflectivity. The materials pertaining the group consisting of Al, Ag, Cr, Cu, Mi, Mg, Pt and Au can be mentioned as the metal film layer having a high degree of reflectivity. The conductive metal reflection layer of the present invention can be formed by any of the conventionally known techniques. The technique can be exemplified by the sputtering method using the aforementioned raw materials.

The conductive metal has an electric conductivity of preferably 6.0 S/m (meter per siemens) or more, more preferably, 30 S/m or more. To put it more specifically, Al (40 S/m), Ag (67 S/m), Au (46 S/m) are preferably used from the viewpoint of reflectivity and electric conductivity.

(Protective Layer)

The protective layer is preferably formed by coating and drying the resin dissolved in a solvent. The polymer having a glass transition point of 30 through 100° C. is preferably used from the viewpoint of bonding of the film between the evaporated crystal and substrate. To put it more specifically, the preferred polymers are exemplified by a polyurethane resin, vinyl chloride copolymer, vinyl chloride-vinyl acetate copolymer, vinyl chloride-vinylidene chloride copolymer, vinyl chloride-acrylonitrile copolymer, butadiene-acrylonitrile copolymer, poly amide resin, polyvinyl butyral, polyester resin, cellulose derivative (e.g., nitro cellulose), styrene butadiene copolymer, various forms of synthetic rubber resins, phenol resin, epoxy resin, urea resin, melamine resin, phenoxy resin, silicon resin, acryl based resin and urea formamide resin. The polyester resin is used preferably in particular.

The film thickness of the protective layer is preferably 0.1 μm or more for excellent bondability, and preferably 3.0 μm or more for ensuring satisfactory smoothness on the protective layer surface. More preferably, the thickness of the protective layer is in the range of 0.2 through 2.5 μm.

The examples of the solvent used to produce the protective layer include lower alcohols such as methanol, ethanol, n-propanol and n-butanol; chlorine atom-containing hydrocarbons such as methylene chloride and ethylene chloride; ketones such as acetone, methyl ethyl ketone and methyl isobutyl ketone; aromatic compounds such as toluene, benzene, cyclohexane, cyclohexanone and xylylene; esters of lower fatty acid and lower alcohol such as methyl acetate, ethyl acetate and butyl acetate; ethers such as dioxane, ethylene glycol monoethyl ester and ethylene glycol monomethyl ester; and the mixtures thereof.

(Formation of Phosphor Layer)

Figure 2:
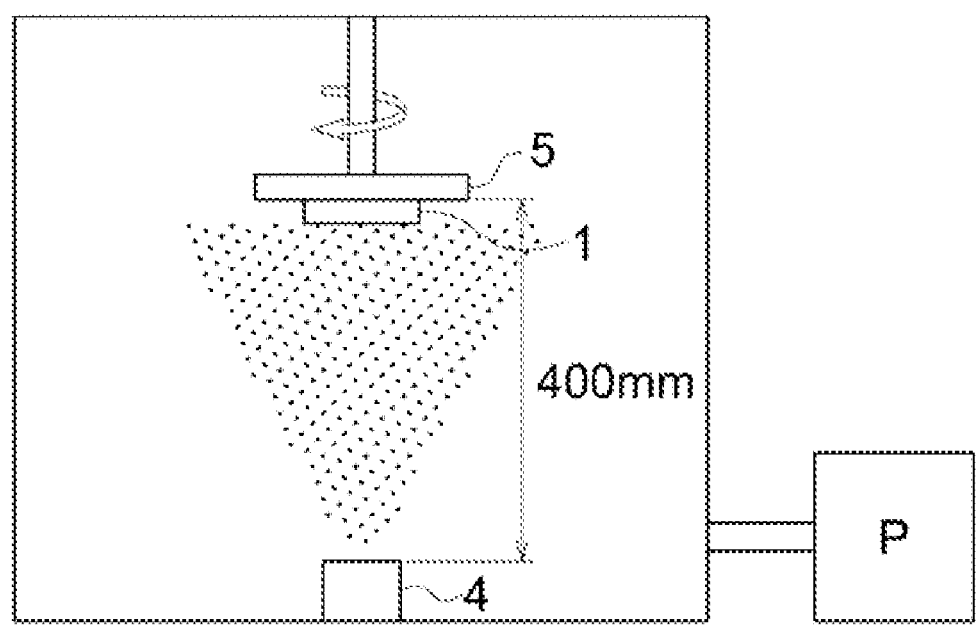
FIG. 2 is a cross sectional view schematically illustrating an example of a CsI evaporation apparatus.

The phosphor layer of the present invention can be produced by the vacuum evaporation apparatus schematically illustrated in FIG. 2.

(Formation of Scintillator Panel)

The scintillator sheet with a phosphor layer arranged on a substrate is sandwiched between the upper and lower protective films, and fusion-bonding is used to seal the ends wherein the upper and lower protective films come into contact under reduced atmospheric pressure, whereby a scintillator panel is produced.

FIG. 1 is a cross sectional view showing an example of the scintillator panel of the present invention. In FIG. 1, 1 represents a substrate, 2 represents a phosphor layer and 3 represents a protective film.

EXAMPLES

The following describes the present invention with reference to Examples, however, the present invention is not limited thereto.

Example 1

Production of a Scintillator Panel (Production of a Phosphor Layer)

A scintillator sheet was produced by evaporating cesium iodide (hereinafter referred to as "CsI") according to the following technique as a phosphor layer onto a 10 cm square polyimide substrate having a thickness of 0.2 mm.

FIG. 2 is a cross sectional view schematically showing an example of a CsI evaporation apparatus. A molybdenum resistance heating crucible 4 was charged with CsI, and a substrate 1 made of polyimide resin was placed on a rotating support member 5 of 1 mm-thick aluminum plate. The distance between the support member and resistance heating crucible was adjusted to 400 mm. Then the evaporating apparatus was evacuated using pump P. Subsequently, argon gas was introduced to adjust the degree of vacuum to 0.5 Pa. While the support member was rotated at a rate of 10 rpm, the temperature of the support member was kept at 200° C. Then, the resistance heating crucible was heated to evaporate the phosphor until the thickness of the phosphor layer film reached at 160 μm.

(Production of a Protective Film)

Twelve μm-thick polyethylene terephthalate (PET) films having various surface roughness were used as the protective film of the scintillator sheet. An adhesive (Byron 300 by Toyobo Co., Ltd.) was coated on the side of each PET film in contact with the phosphor and dried to form an adhesive layer 1 μm). Further, a light absorbing layer having light transmittance different from each other described below was coated on the opposite side of the PET film.

(Production of Light Absorbing Layer)

Fifty grams of fluoroolefin-vinyl ether copolymer (Lumiflon LF100 by Asahi Glass Co., Ltd., 50% by mass of xylylene solution) as a fluorine-containing resin, and 5 grams of isocyanate (Coronate HX by Japan Polyurethane Co., Ltd., with 100% by mass of solids) and 0.5 grams of alcohol-modified silicone oligomer (having a dimethyl polysiloxane moiety, and a hydroxyl group (carbinol group) on both ends, by Shin-Etsu Chemical Co., Ltd., X-22-2809, with 66% by mass of solids) as a cross-linking agent were added to the methyl ethyl ketone solvent to prepare a coating liquid having a viscosity of 0.1 through 0.3 P.

Next, in this coating liquid, a mixed dispersion containing an organic blue colorant (Zabon First Blue 3G by Hoechst Co., Ltd.) preliminarily dispersed in methyl ethyl ketone and silica particles (having an average particle diameter of 3.0 μm) were added. This coating liquid was applied on the surface of the PET film using a doctor blade, then heat-treated at 120° C. for 20 minutes and was subjected to thermosetting, whereby a light absorbing layer was formed.

The added amounts of the colorant and silica were adjusted to produce a light absorbing layer having a desired surface roughness and light transmittance (Tests No. 2 through 5). As a comparative protective film, produced was a protective film which differed only in that the aforementioned light absorbing layer was not contained (Test No. 1).

(Sealing)

Using the protective film containing the aforementioned light absorbing layer, heat sealing was carried out under the reduced pressure of 1000 Pa so that the distance from the sealed portion to the periphery of the scintillator sheet was 1 mm. The heater of the impulse sealer used for heat-sealing was 3 mm wide.

[Evaluation]

The sample having been produced was set on a 10 cm×10 cm sized CMOS flat panel (by Radicon Co., Ltd., X-rays CMOS camera system Shad-o-Sox 4 KEV). A sponge sheet was arranged on the radiation incoming side (where there is no phosphor) of the carbon plate of the radiation incoming screen and scintillator panel. They were secured in position by gently pressing the flat light receiving element surface against the scintillator panel.

X-rays generated from a tube voltage of 80 kVp were applied to the rear side of each sample (surface where phosphor layer was not formed) through the lead-made MTF chart. Image data was detected by the CMOS flat panel with the scintillator arranged thereon. The result was recorded on the hard disk. After that, the record on the hard disk was analyzed by a computer and the Modulation Transfer Function MTF (MTF value at a space frequency of 1 cycle/mm) of the X-ray image recorded on this hard disk was used as an indicator of sharpness. In the Table, a higher MTF value indicates a higher degree of sharpness. MTF is an abbreviation for Modulation Transfer Function.

(MTF)

A: MTF value at a space frequency of 1 cycle/mm is 0.9 or more.

B: MTF value at a space frequency of 1 cycle/mm is 0.7 or more and less than 0.9.

C: MTF value at a space frequency of 1 cycle/mm is 0.6 or more and less than 0.7.

D: MTF value at a space frequency of 1 cycle/mm is less than 0.6.

(Relative Luminance)

The following describes the procedure of obtaining the relative luminance: the intensity of light emitted when X-rays (tube voltage: 80 kVp) were applied was measured, and was compared with the intensity observed for the sample having no light absorbing layer (Comparative sample). The observed intensity ratio was employed as the relative luminance.

TABLE 1

| Test No. | Light absorbing layer | Transmittance (%) | MTF | Relative luminance | Remarks |
|---|---|---|---|---|---|
| 1 | Not provided | 100 | B | 1.00 | Comparative |
| 2 | provided | 95 | A | 0.98 | Inventive |
| 3 | provided | 80 | A | 0.97 | Inventive |
| 4 | provided | 60 | A | 0.90 | Inventive |
| 5 | provided | 40 | A | 0.45 | Inventive |

Table 1 demonstrates that use of the light absorbing layer yields the radiation image characterized by enhanced MTF (sharpness). A lower transmittance of the light absorbing layer represents a lower relative luminance and a reduced luminance characteristic. The table shows that the preferable transmittance of the light absorbing layer lies in the range of 97 to 50%.

What is claimed is:

1. A radiation detector comprising a scintillator panel and a flat light receiving element pressed against the scintillator panel,
   wherein the scintillator panel further comprises:
   a scintillator sheet comprising a substrate having thereon a phosphor layer produced with a vacuum evaporation method; and
   a protective film covering the scintillator panel, wherein the protective film comprises a light absorbing layer which is colored so as to absorb a light emitted from the phosphor layer.

2. The scintillator panel of claim 1, wherein a transmittance of the protective film at an emission wavelength of the light emitted from the phosphor layer is 50 to 97%.

3. The scintillator panel of claim 1, wherein a thickness of the protective film is 10 to 100 μm.

4. The scintillator panel of claim 1, wherein a moisture permeability of the protective film is 50 g/m2·day or less.

5. The scintillator panel of claim 1, wherein the phosphor layer comprises CsI.

* * * * *